Patented May 8, 1928.

1,668,797

UNITED STATES PATENT OFFICE.

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND.

NORMAL TRIBUTYL BORATE.

No Drawing. Application filed September 26, 1927. Serial No. 222,217.

My invention relates to a new composition of matter comprising normal tributyl borate and a process for producing this material. This compound is believed to have the following structural formula:

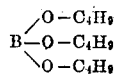

Normal tributyl borate is a colorless liquid, practically odorless which boils without decomposition at 230–5° C. under atmospheric pressure or at about 190° C. under 200 mm. pressure. The specific gravity of the pure material is about 0.84. It is very easily decomposed by water, the reaction hydrolyzing the ester to produce boric acid and normal butyl alcohol.

Normal tributyl borate burns with a green flame but on account of the relatively high boiling point it is not easily inflammable.

In preparing the new compound 62 grams of crystallized boric acid ($H_3BO_3$) was placed in a distillation flask with 450 grams of butanol and the mixture was distilled. After about 250 cc. of distillate had been collected an additional 200 grams of fresh butanol was added to the flask and distillation resumed until the vapor temperature had risen suddenly from 117 to 150° C. After this point had been reached the remaining excess of butanol in the flask was removed by vacuum distillation. The residue in the flask consisting of normal tributyl borate was then distilled under pressure of about 200 mm. and boiled at about 190° C.

In the past other alkyl borates have been prepared by heating alcohol and boric acid in a sealed glass tube to an elevated temperature and pressure. My improved process, whereby normal tributyl borate is prepared at atmospheric pressure and at a low temperature without an esterification catalyst is due to the property of normal butyl alcohol in forming a constant boiling mixture with water. In the process as described the esterification is promoted by the fact that the distillation of the excess of butanol removes the water of reaction as fast as it forms and thus permits the esterification to go to completion.

Normal tributyl borate is a valuable intermediate and may be used to introduce the butyl group into various other chemical compounds. For example, it readily reacts with aniline to produce butyl aniline. It may also be employed for producing ethers and other organic compounds.

In the method of preparing normal tributyl borate described above only boric acid has been used. It is understood, however, that for the purpose of preparing this compound boric anhydride may be regarded as the equivalent of boric acid and in the appended claims the term boric acid is used with this understanding. It is understood, of course, that when boric anhydride is employed in place of boric acid the proportions of the constituents entering into the operation will be modified accordingly.

Now having fully described my invention I claim the following as new and novel:

1. As a new composition of matter, the normal tributyl ester of boric acid.

2. As a new composition of matter, a reaction product of boric acid and normal butyl alcohol, a colorless liquid boiling at 230–5° C.

3. A composition of matter comprising a normal butyl ester of boric acid and having the following formula

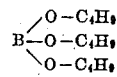

4. A process for producing an ester of boric acid which comprises mixing together boric acid and a molecular excess of normal butyl alcohol, and distilling said mixture.

5. A process for producing normal tributyl borate which comprises distilling together boric acid and a molecular excess of normal butyl alcohol until the water of reaction and excess butanol have been removed.

6. A process as described in claim 5, in which the normal tributyl borate is finally purified by vacuum distillation.

In testimony whereof I affix my signature.

WILLIAM J. BANNISTER.